United States Patent
Kao et al.

(10) Patent No.: US 8,740,447 B2
(45) Date of Patent: Jun. 3, 2014

(54) FLAT PANEL DISPLAY

(75) Inventors: Lien-Te Kao, New Taipei (TW);
Chi-Yeh Lu, New Taipei (TW);
Ming-Hong Pan, New Taipei (TW);
Ting-Feng Chen, New Taipei (TW);
Ching-Fu Hsu, New Taipei (TW);
Tzu-Wei Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 224 days.

(21) Appl. No.: 13/237,938

(22) Filed: Sep. 21, 2011

(65) Prior Publication Data
US 2012/0250289 A1 Oct. 4, 2012

(30) Foreign Application Priority Data

Apr. 1, 2011 (CN) .......................... 2011 1 0081284

(51) Int. Cl.
*F21V 7/04* (2006.01)
(52) U.S. Cl.
USPC .......................................... 362/634; 362/632
(58) Field of Classification Search
CPC .................... G02F 1/133608; G02F 1/133615; G02F 1/133603; G02F 1/133604; G02B 6/0091; G02B 6/0073; G02B 6/0081; G02B 6/0083; G02B 6/0021; G02B 6/0088; G02B 6/0068; G02B 6/0031; G02B 6/009
USPC ...................... 362/230–21, 240, 249.632–634
See application file for complete search history.

(56) References Cited

U.S. PATENT DOCUMENTS

| | | | |
|---|---|---|---|
| 6,593,979 B1 * | 7/2003 | Ha et al. | 349/58 |
| 6,894,757 B2 * | 5/2005 | Ha et al. | 349/149 |
| 7,098,984 B2 | 8/2006 | Ha | |
| 7,178,968 B2 * | 2/2007 | Sugahara et al. | 362/633 |
| 7,248,327 B2 | 7/2007 | Ha | |
| 7,505,668 B2 | 3/2009 | Hong | |
| 7,649,590 B2 * | 1/2010 | Park et al. | 349/65 |

(Continued)

FOREIGN PATENT DOCUMENTS

| | | |
|---|---|---|
| JP | S6413522 A | 1/1989 |
| JP | H03122484 U | 12/1991 |

(Continued)

OTHER PUBLICATIONS

Office action mailed on Nov. 28, 2012 for Korean Application No. 10-2011-0101020, p. 1-4.

(Continued)

*Primary Examiner* — Julie Bannan
(74) *Attorney, Agent, or Firm* — Winston Hsu; Scott Margo

(57) ABSTRACT

In a flat panel display having integral frame structure, features of a metal frame and a plastic support, which support, position, and fix each component, are incorporated as an integral frame structure, such that no additional structure component is needed for the flat panel display to assemble the backlight module and the panel module. The frame structure is assembled to the bottom cover via screw that can reduce defectiveness of repetitive processing. A concave section at the bottom of the frame structure can contain a control circuit board for the panel cell such that the control circuit board can be rerouted downward to the bottom of the frame structure. The space required at the light source side of the flat panel display can be reduced, hence leading to the flat panel display with thin frame at the light source side.

9 Claims, 8 Drawing Sheets

(56) References Cited

U.S. PATENT DOCUMENTS

| | | | |
|---|---|---|---|
| 8,421,950 B2* | 4/2013 | Kim et al. | 349/58 |
| 2003/0123243 A1* | 7/2003 | Eiraku et al. | 362/26 |
| 2009/0147534 A1* | 6/2009 | Hamada | 362/612 |

FOREIGN PATENT DOCUMENTS

| | | | |
|---|---|---|---|
| JP | 9147618 A | 6/1997 | |
| JP | H1185045 A | 3/1999 | |
| JP | H11202787 A | 7/1999 | |
| JP | 11510846 A | 9/1999 | |
| JP | 11312715 A | 11/1999 | |
| JP | 11338371 A | 12/1999 | |
| JP | 2002287659 A | 10/2002 | |
| JP | 2002366044 A | 12/2002 | |
| JP | 200329649 A | 1/2003 | |
| JP | 2003114764 A | 4/2003 | |
| JP | 2004258060 A | 9/2004 | |
| JP | 200543716 A | 2/2005 | |
| JP | 200752183 A | 3/2007 | |
| JP | 2008216939 A | 9/2008 | |
| JP | 2008282045 A | 11/2008 | |
| JP | 200986071 A | 4/2009 | |
| JP | 2010134413 A | 6/2010 | |
| JP | 2010238659 A | 10/2010 | |
| KR | 1020030005660 A | 1/2003 | |
| KR | 1020040046418 A | 6/2004 | |
| KR | 1020070066634 A | 6/2007 | |
| KR | 1020070101946 | 10/2007 | |
| KR | 1020070107462 | 11/2007 | |
| KR | 1020110032319 | 3/2011 | |

OTHER PUBLICATIONS

Office action mailed on May 21, 2013 for the Japan application No. 2011-222686, filing date: Oct. 7, 2011.

Office action mailed on May 31, 2013 for the Korea application No. 10-2011-0101020, filing date: Oct. 5, 2011.

Office action mailed on May 24, 2013 for the Korea application No. 10-2012-0033443.

Office action mailed on Nov. 27, 2013 for the Korea application No. 10-2011-0101020, filing date: Oct. 5, 2011, page 1 line 21~27, p. 2 and p. 3 line 1.

Office action mailed on Oct. 1, 2013 for the Japan application No. 2012-080474, p. 1 line 7~19 and line 21~30, p. 2~3 and p. 4 line 1~23.

* cited by examiner

FLAT PANEL DISPLAY

BACKGROUND OF THE INVENTION

1. Field of the Invention

The invention relates to a flat panel display, and more particularly, to a flat panel display with thin frame design at light source and control board side.

2. Description of the Prior Art

Conventional flat panel displays need frame structure to protect the backlight module and each components of the panel, such as a light emitting diodes source, a light guide plate, optical films, prism film, cell . . . etc. After the components are assembled together in the frame structure to be a panel module in panel factory, the panel module is then transported to a system factory for assembling with outermost housings, generally including a top cover and a bottom cover. The top cover and the bottom cover assembled in the system factory usually serve as protection and ornamentation for the panel module, not having any supportive function to the structure of the panel module.

Please refer to FIG. 1. FIG. 1 is a schematic diagram showing a non light source side assembly of a panel module 10 according to the prior art. The panel module 10 takes a frame structure 11 as the main supportive structure. Inside the frame structure 11, a plastic support 12 is assembled first, then a reflector 13, a light guide plate 14, and optical films 15 are placed thereon in order, and a cell 16 is then mounted to the plastic support 12. Finally, a top frame 17 is fixed to the frame structure 11 and the cell 16 in order to fix and protect the cell 16. After the assembling of the panel module 10 shown in FIG. 1 is completed, a top cover 19 and a bottom cover 18 are assembled to the panel module 10 as ornamental components as shown in FIG. 2. FIG. 3 shows a schematic diagram of the flat panel display 20 in FIG. 2 showing a light source side. A backlight unit 27 at the light source side is fixed inside the frame structure 11 at the side of the light guide plate 14, whereas a cushion 28 is added between the backlight unit 27 and the cell 16 to provide proper gap therebetween. A control circuit board 161 utilized for driving and controlling the cell 16 is configured outside the light source side of the bottom cover 18, right at a housing 181 of the bottom cover 18. The control circuit board 161 is electrically connected to the cell 16 via a chip on film circuit 162. FIG. 3 shows that an additional space is required to accommodate the control circuit board 161; therefore, the flat panel display 20 according to the prior art needs additional frame size for at least the width $W_2$ at the light source side. In such way, the frame width at the light source side of the flat panel display 20 is approximately $W_1+W_2$, which is a limitation for further reducing the frame width.

SUMMARY OF THE INVENTION

An embodiment of the invention provides a flat panel display with thin frame. The flat panel display includes a frame structure, a reflector, a backlight unit, a light guide plate, an optical film, a control circuit board, a cell, and a top frame. The frame structure includes a first supportive part, a second supportive part, and a side portion. The first supportive part includes a concave section. The reflector is configured on the first supportive part, the backlight unit and the light guide plate are configured on the reflector, and the optical film is configured on the light guide plate. The control circuit board is configured at the concave section of the frame structure. The cell is placed on the second supportive part and is electrically connected to the control circuit board via a flexible connecting wiring. The top frame is mounted to the cell and the side portion for fixing the cell.

An embodiment of the invention provides the flat panel display with thin frame wherein the frame structure is monolithic structure. The reflector, the backlight unit and the light guide plate, and the optical film stack on the first supportive part in order along a first direction. The cell is placed on the second supportive part along the first direction, the side portion of the frame structure has the orientation of the first direction, and the flexible connecting wiring extends along the first direction to connect the control circuit board.

An embodiment of the invention provides the flat panel display that further includes a first cover and a second cover. The first cover includes a first assembling end and the second cover includes a second assembling end. The frame structure includes a protrusion located at the side portion for being fixed to the first cover via a fixture so that the frame structure is assembled to the first cover. The second cover covers on the perimeter of the cell and is assembled with the first cover by the second assembling end fixing to the first assembling end.

An embodiment of the invention provides the flat panel display wherein the flexible connecting wiring is a chip on film (COF) circuit, and the backlight unit is a light emitting diode configured at a side of the light guide plate. The flexible connecting wiring extends along a light source side toward the concave section and connects to the control circuit board.

An embodiment of the invention provides the flat panel display that further includes a cushion configured between the backlight unit and the cell.

The flat panel display provides by the embodiments of the invention places the control circuit board, which drives and controls the cell, at the downside of the frame structure via the flexible connecting wiring so as to extensively reduce the width of the outer frame at the light source side. The monolithic frame structure further reduces the cost of material and cost for package and transportation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
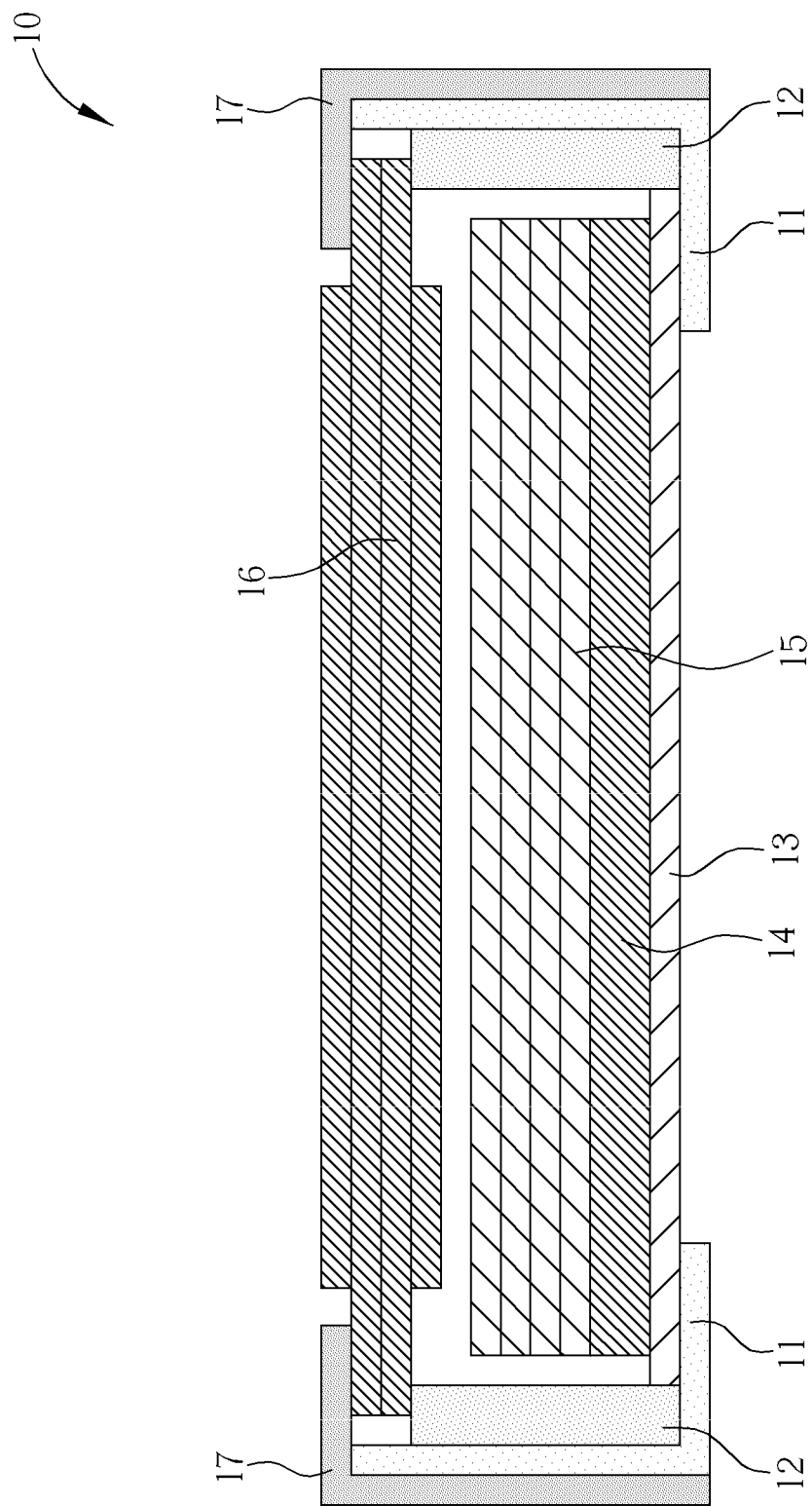
FIG. 1 is a schematic diagram showing a non light source side assembly of a panel module according to the prior art.
Figure 2:
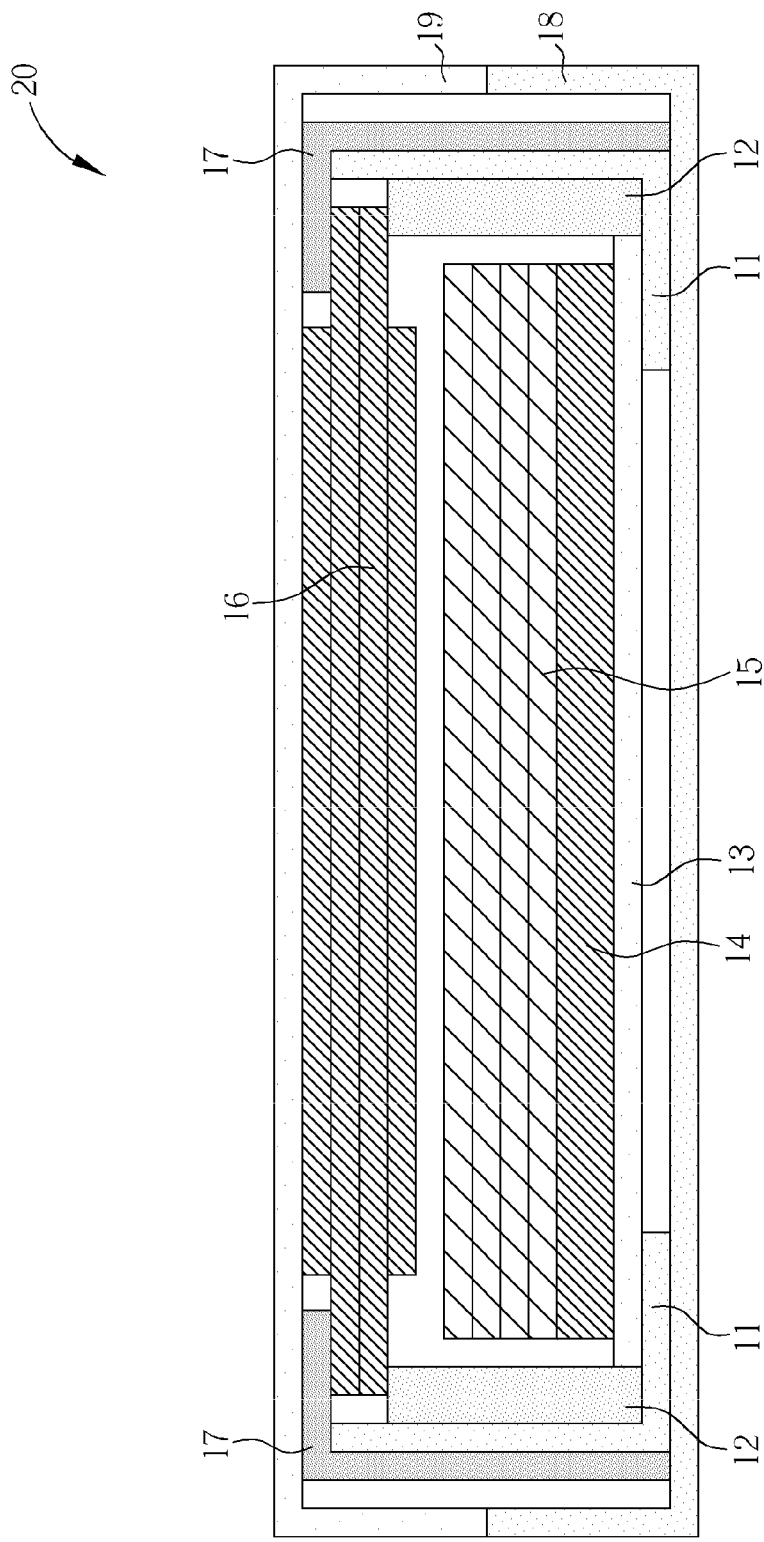
FIG. 2 is a schematic diagram of the flat panel display in FIG. 1 with top and bottom covers.
Figure 3:
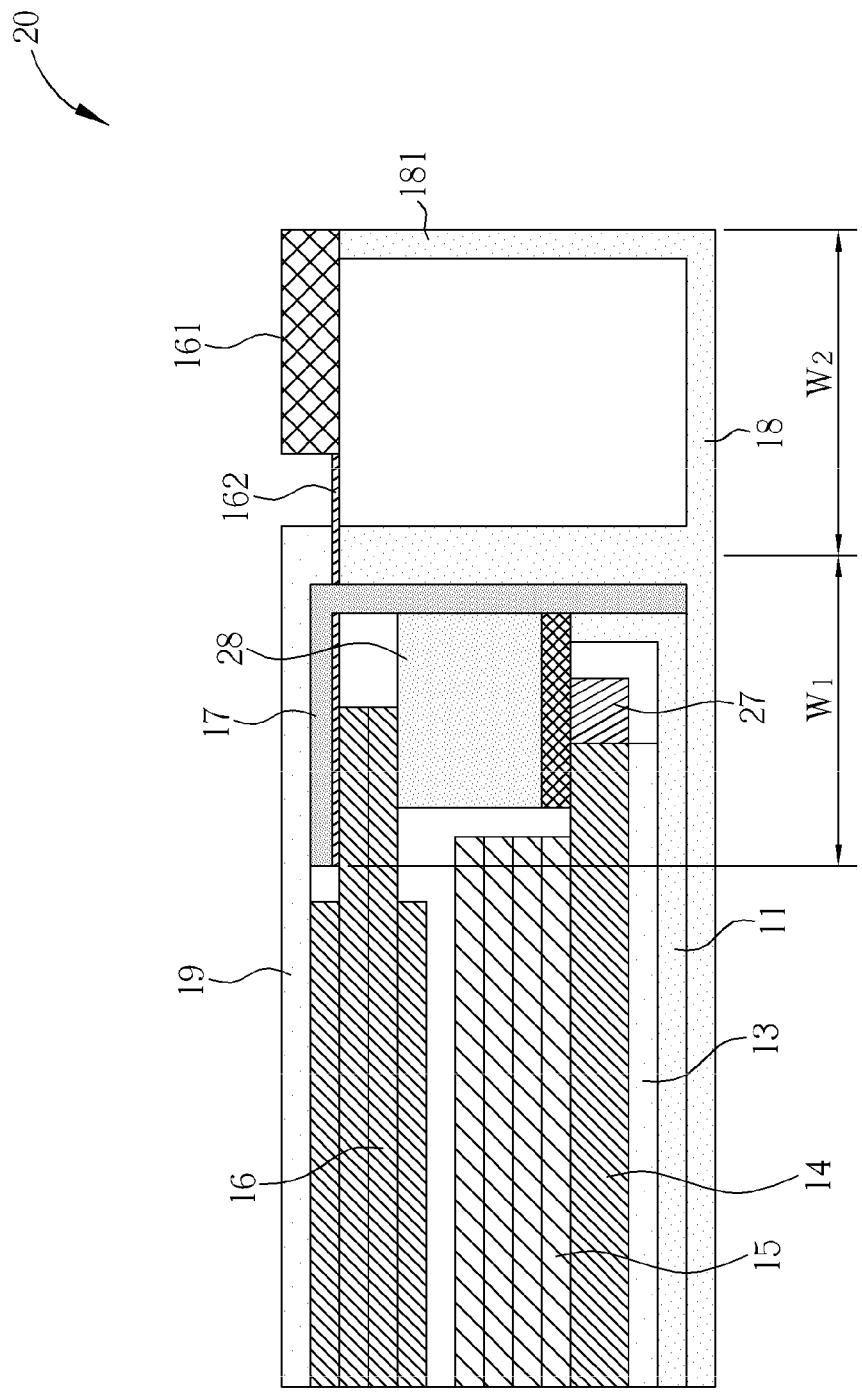
FIG. 3 shows a schematic diagram of the flat panel display in FIG. 2 showing a light source side.
Figure 4:
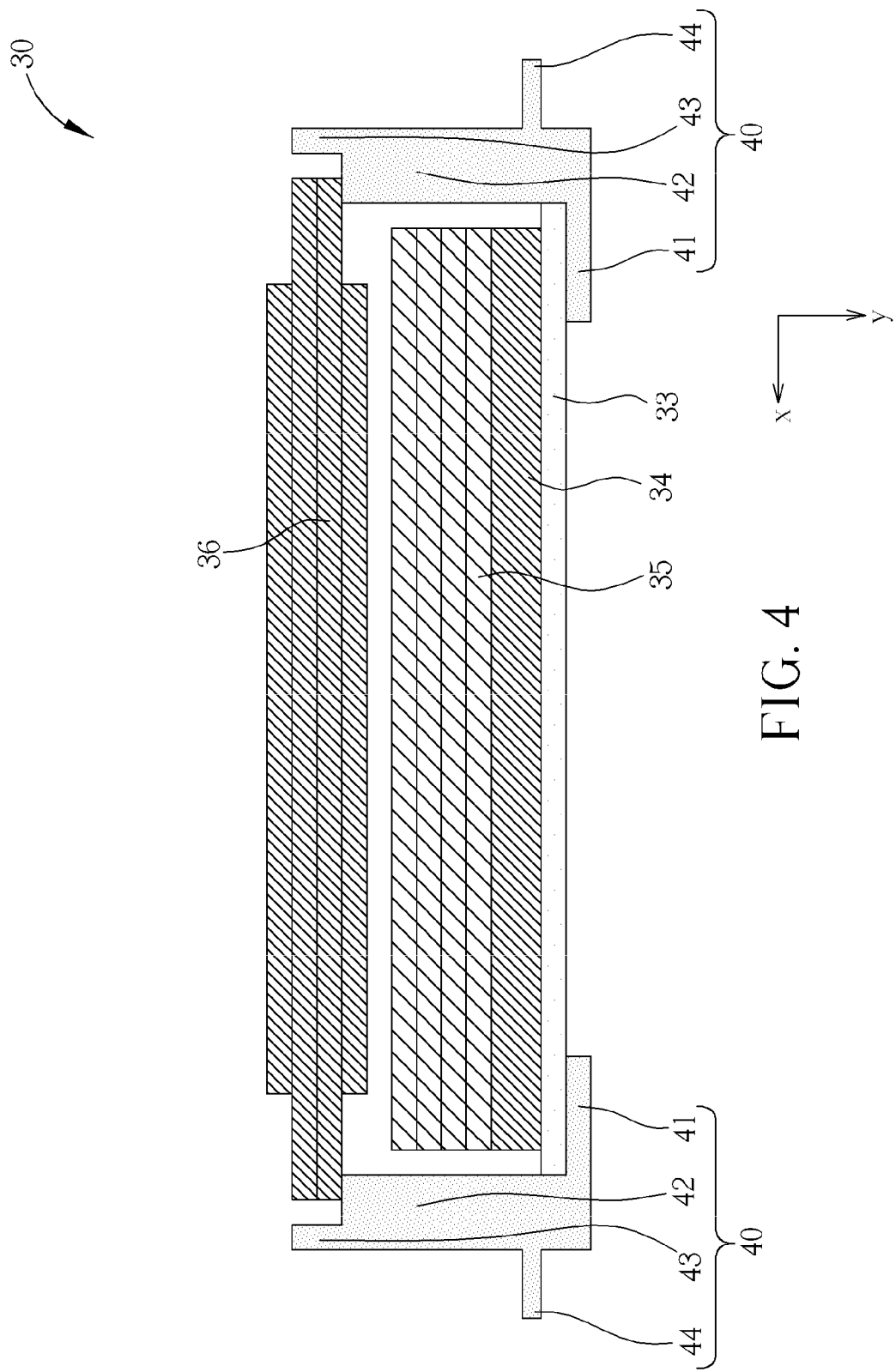
FIG. 4 is a schematic diagram of a panel module showing a non light source side according to an embodiment of the invention.
Figure 7:
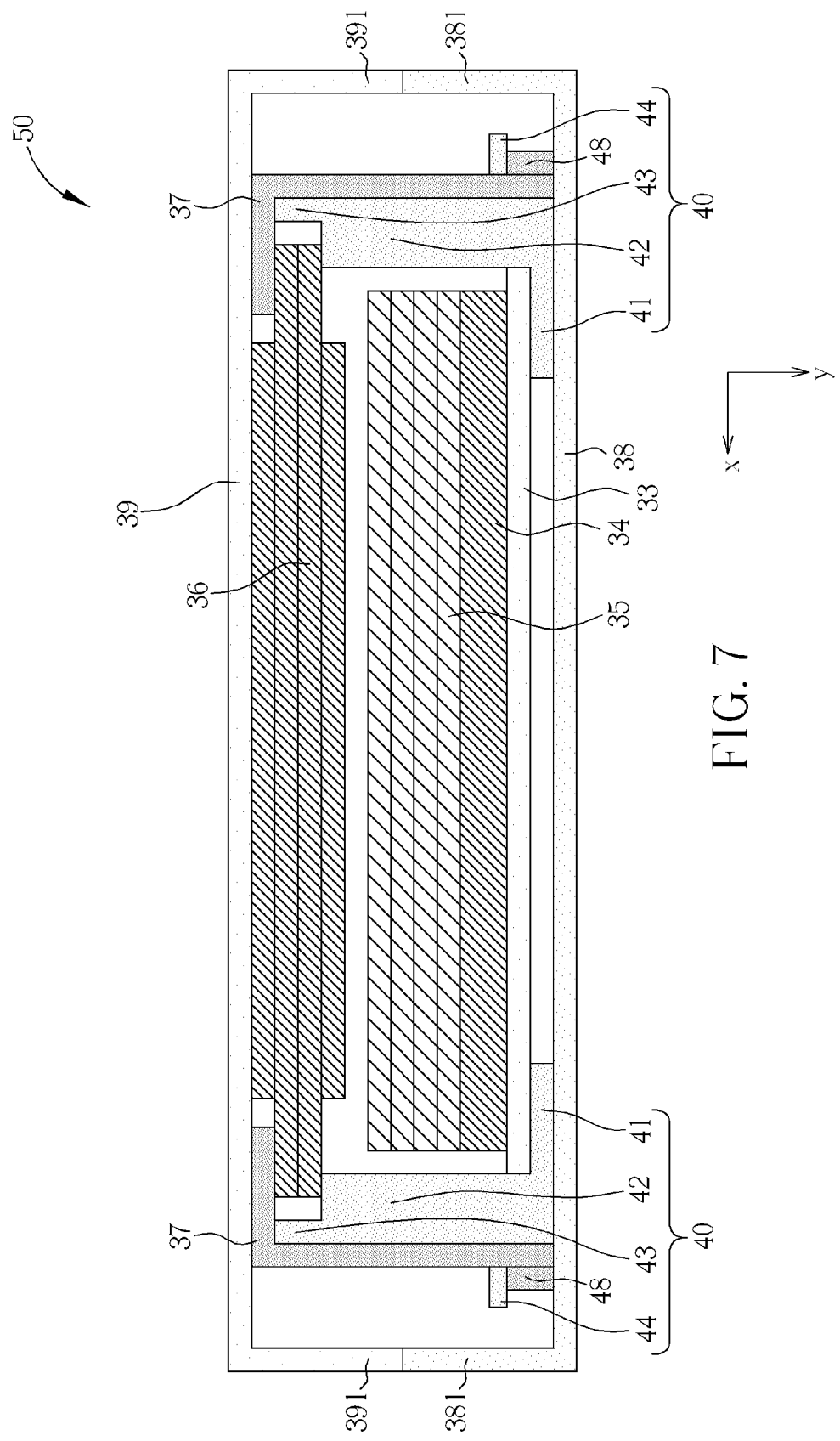
FIG. 7 is a schematic diagram of the flat panel display showing a non light source side.

The invention reduces the number of components and cost of a flat panel display, such as the display for the upper part over the hinge of a notebook, by using a first cover in replace of the frame and the plastic support of the display. Please refer to FIG. 4. FIG. 4 is a schematic diagram of a panel module 30 showing a non light source side according to an embodiment of the invention. The panel module 30 includes a frame structure 40 that is a monolithic structure, which can be made of polycarbonate (PC), mixture of polycarbonate and acrylonitrile butadiene styrene (ABS), or materials utilized for injection molding, and is used as the inner supportive structure of a flat panel display 50, as shown in FIG. 7. The frame structure 40 includes a first supportive part 41, a second supportive part 42, and a side portion 43. In the embodiment of the invention, the first supportive part 41 and the second supportive part 42 have an orientation along the x direction, or the horizontal direction, in the figure to provide excellent support for the components of the flat panel display 50. The side portion 43 has an orientation along the y direction, or the vertical direction, in the figure to be assembled to other components. The shape of the frame structure 40 in the figure only reveals an embodiment of the invention, which should not be a limit, and any frame structure 40 that has features aforementioned should be included in the scope of the invention.

The panel module 30 of the flat panel display 50 also includes a reflector 33, a backlight unit (such as the backlight unit 57 in FIG. 8) and a light guide plate 34, a plurality of optical films 35, and a cell 36. During the assembling process, the reflector 33, the backlight unit 57 and the light guide plate 34, the optical films 35 stack vertically downward, or the direction along the y axis in FIG. 4, on the first supportive part 41 of the frame structure 40 in order. To put it more specific, the reflector 33 is configured on the first supportive part 41, the backlight unit 57 and the light guide plate 34 are configured on the reflector 33, and the optical films 35 are configured on the light guide plate 34. The cell 36 is then vertically placed downward on the second supportive part 42.

Figure 5:
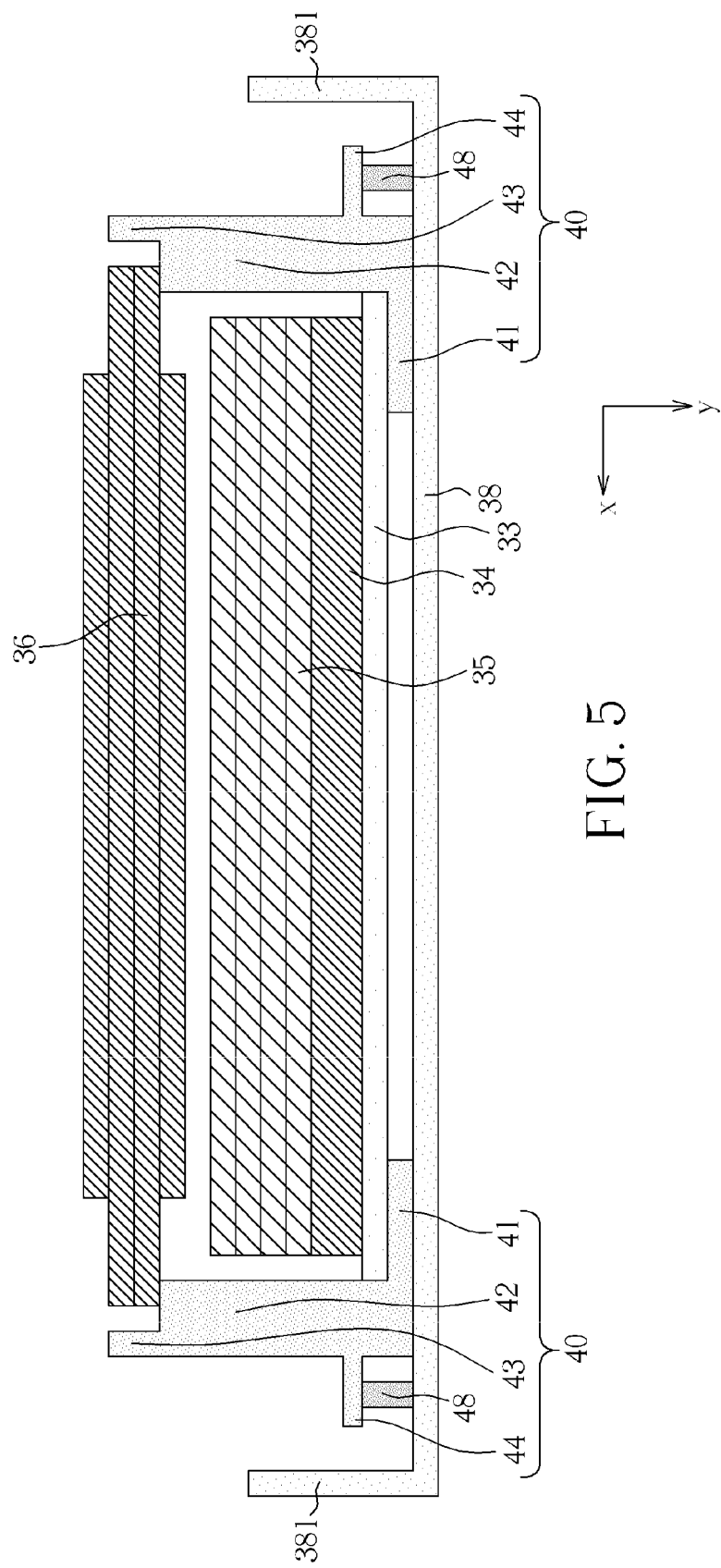
FIG. 5 is a schematic diagram of the panel module in FIG. 4 assembled with a first cover showing a non light source side according to an embodiment of the invention.

Please refer to FIG. 5, which is a schematic diagram of the panel module 30 in FIG. 4 assembled with a first cover 38, or the bottom cover, showing a non light source side according to an embodiment of the invention. The first cover 38 includes a first assembling end 381 extends upward along the y axis so as to assemble with a second cover. The frame structure further includes a protrusion 44 and in this embodiment, the protrusion 44 extends out of the side portion 43 horizontally. Fixtures 48, such as screws or other types of fixing elements, can be used to fix the frame structure 40 to the first cover 38, and with such fixation between the first cover 38 and the frame structure 40, it is easy to disassemble the two components, which substantially reduces defectiveness of repetitive processing.

Figure 6:
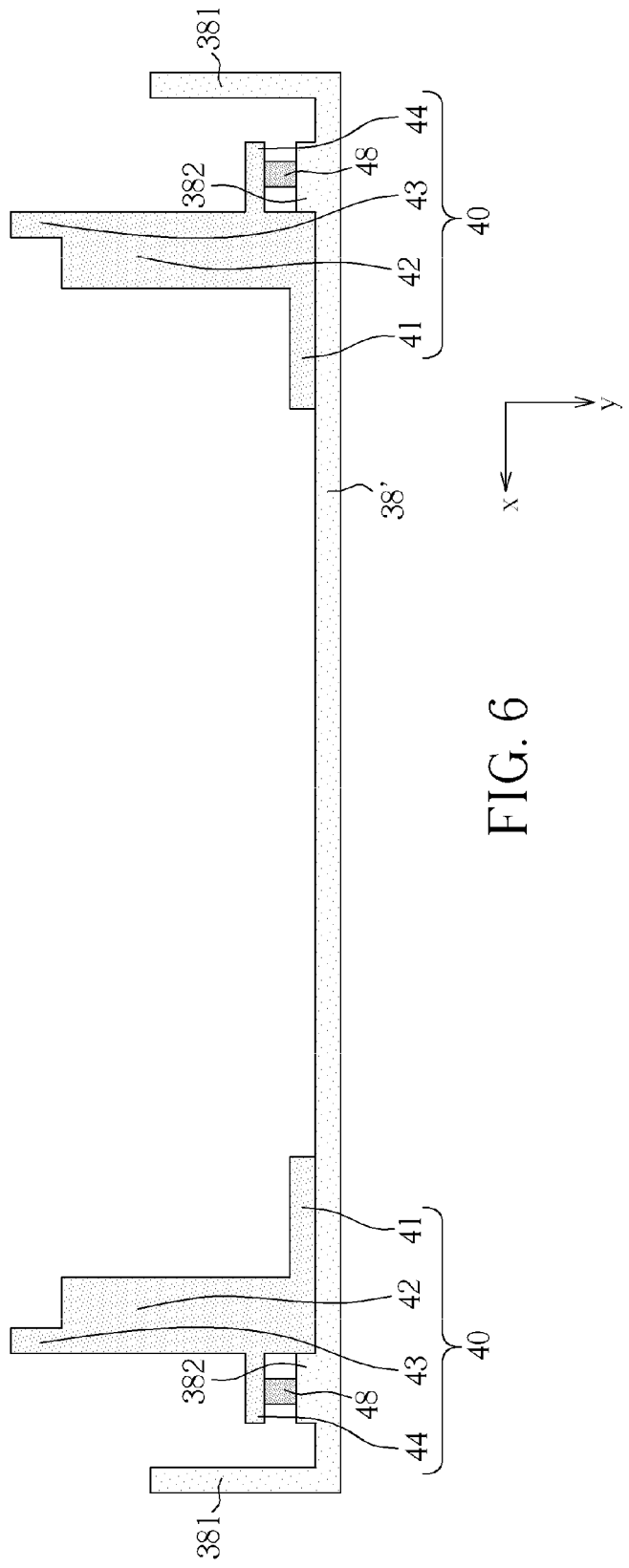
FIG. 6 is a schematic diagram of a first cover according to another embodiment assembled with the frame structure showing a non light source side.

Please refer to FIG. 6, which is a schematic diagram of a first cover 38' according to another embodiment assembled with the frame structure 40. The first cover 38' may further dispose a positioning section 382 as shown in FIG. 6 for allowing easy fixing of the fixture 48 to the protrusion 44 and the positioning section 382, thereby the frame structure 40 being well positioned when assembled with the first cover 38'.

In FIG. 7, a top frame 37 of the flat panel display 50 is then mounted to the cell 36 and the side portion 43 of the frame structure 40, so as to fix and protect the cell 36. Finally, a second cover 39, or a top cover, of the flat panel display 50 is put vertically downward to cover the perimeter of the cell 36 and is mounted and assembled to the first cover 38 by using a second assembling end 391 of the second cover 39, also vertically oriented, assembling to the first assembling end 381 of the first cover 38, so as to complete the assembling process of the flat panel display 50. With the specially designed frame structure 40 of the embodiment of the invention, each component of the flat panel display 50, including the first cover 38 and the second cover 39, mentioned above can be directly and completely assembled in a single plant, saving cost of the assembling process and the package and transportation between different plants.

Figure 8:
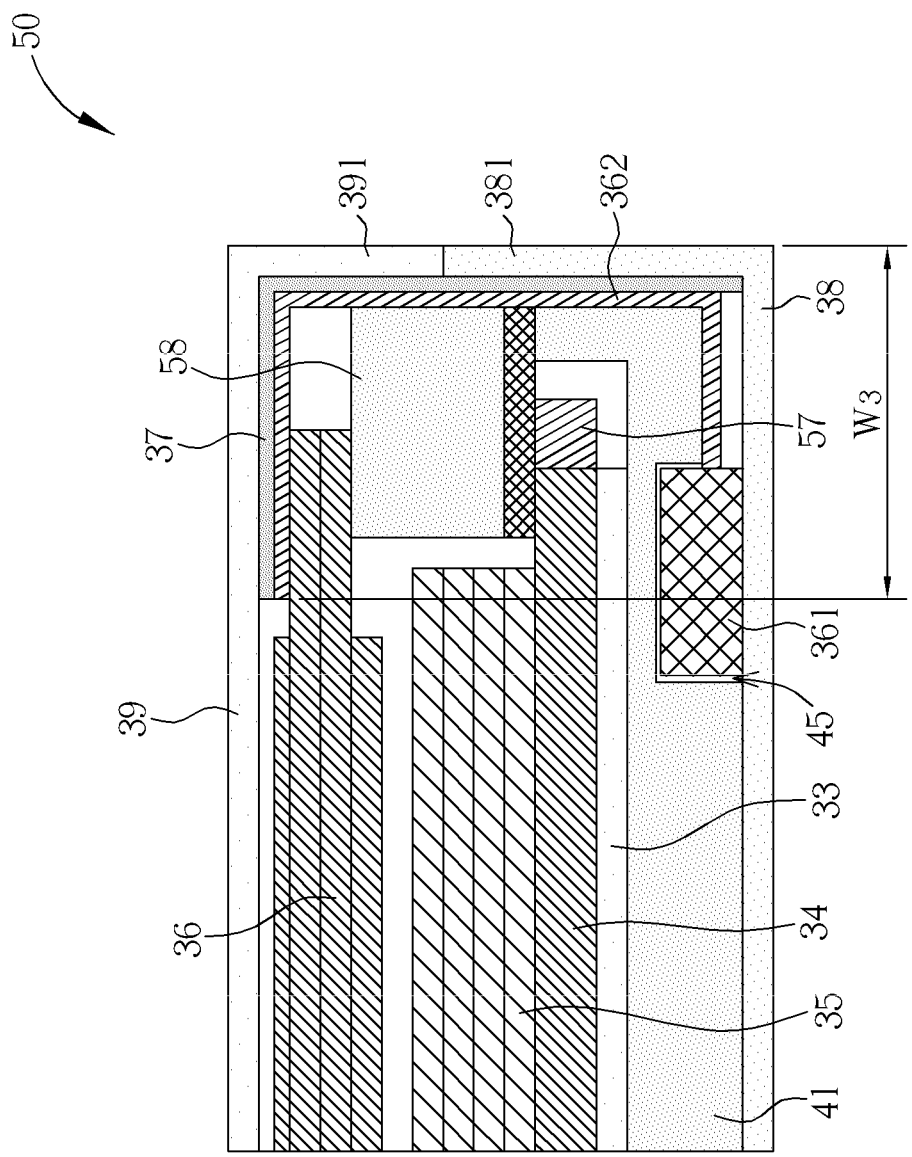
FIG. 8 is a schematic diagram of the flat panel display showing a light source side according to an embodiment of the invention.

Please refer to FIG. 8. FIG. 8 is a schematic diagram of the flat panel display 50 showing a light source side according to an embodiment of the invention. The flat panel display 50 further includes a control circuit board 361 for driving and controlling the cell 36, and a flexible connecting wiring 362 connected between the cell 36 and the control circuit board 361. In order to reduce the thickness of the frame of the flat panel display 50 at the light source side, the control circuit board 361, which is connected by the connecting wiring 362, is rerouted to the downside of the first supportive part 41 of the frame structure 40, where a concave section 45 is disposed at the downside of the first supportive part 41 for containing the control circuit board 361. The connecting wiring 362 is preferably a chip on film (COF) circuit that can be bended at will to fit along the light source side, where the backlight unit 57 of the flat panel display 50 is located, and extend toward, or along the direction y, the concave section 45 of the first supportive part 41, all the way to connect to the control circuit board 361 contained in the concave section 45. Please noted that in this embodiment, the backlight unit 57 is preferably a light emitting diode component that is configured at a side of the light guide plate 34 and defines the light source side of the flat panel display 50. A cushion 58 may further be disposed between the backlight unit 57 and the cell 36 for properly adjusting the distance between these two components. Giving the structure that the control circuit board 361, which is utilized for control the cell 36, is rerouted to be configured at the downside of the frame structure 40, the space needed for the outermost frame of the flat panel display 50 to accommodate the control circuit board 361 at the light source side may be extensively reduced. In such way, the frame width at the light source side of the flat panel display 50 is approximately $W_3$, which benefits the thin frame requirement of the flat panel display 50.

The flat panel display having integral frame structure disclosed in the embodiments of the invention incorporates features of a metal frame and a plastic support, which support, position, and fix each component as the integral frame structure, such that no additional structure component is needed for the flat panel display to assemble the backlight module and the panel module. The frame structure is assembled to the bottom cover via screw that can reduce defectiveness of repetitive processing. The concave section at the bottom of the frame structure can contain a control circuit board for the panel cell such that the control circuit board can be rerouted downward to the bottom of the frame structure. The space required at the light source side of the flat panel display can be reduced, hence leading to the flat panel display with thin frame at the light source side.

Those skilled in the art will readily observe that numerous modifications and alterations of the device and method may be made while retaining the teachings of the invention.

What is claimed is:

1. A flat panel display with thin frame, comprising:
   a frame structure, comprising a first supportive part, a second supportive part, and a side portion, the first supportive part comprising a first surface and a second surface, and the second surface having an indented section formed indenting toward the first surface;
   a reflector, a backlight unit, a light guide plate, and an optical film, wherein the reflector is configured on the first surface of the first supportive part, the backlight unit and the light guide plate are configured on the reflector, and the optical film is configured on the light guide plate;

a control circuit board contained in the indented section of the second surface of the frame structure, wherein the control circuit board and the second surface form a smooth surface and the first supportive part has uniform thickness with the control circuit board contained within;

a cell, placed on the second supportive part and electrically connected to the control circuit board via a flexible connecting wiring; and a top frame, mounted to the cell and the side portion for fixing the cell.

2. The flat panel display of claim 1, wherein the frame structure is unitary structure.

3. The flat panel display of claim 1, wherein the reflector, the backlight unit and the light guide plate, and the optical film stack on the first supportive part in order along a first direction, the cell is placed on the second supportive part along the first direction, the side portion of the frame structure has the orientation of the first direction, and the flexible connecting wiring extends along the first direction to connect the control circuit board.

4. The flat panel display of claim 1, further comprising:

a first cover comprising a first assembling end, the frame structure assembled to the first cover; and a second cover comprising a second assembling end and covering on the perimeter of the cell, the second cover assembled with the first cover by the second assembling end fixing to the first assembling end.

5. The flat panel display of claim 4, wherein the frame structure comprises a protrusion located at the side portion for being fixed to the first cover via a fixture so that the frame structure is assembled to the first cover.

6. The flat panel display of claim 1, wherein the flexible connecting wiring is a chip on film (COF) circuit.

7. The flat panel display of claim 1, wherein the backlight unit is a light emitting diode configured at a side of the light guide plate.

8. The flat panel display of claim 7, wherein the flexible connecting wiring extends along a light source side toward the indented section and connects to the control circuit board.

9. The flat panel display of claim 1, further comprising a cushion configured between the backlight unit and the cell.

\* \* \* \* \*